UNITED STATES PATENT OFFICE.

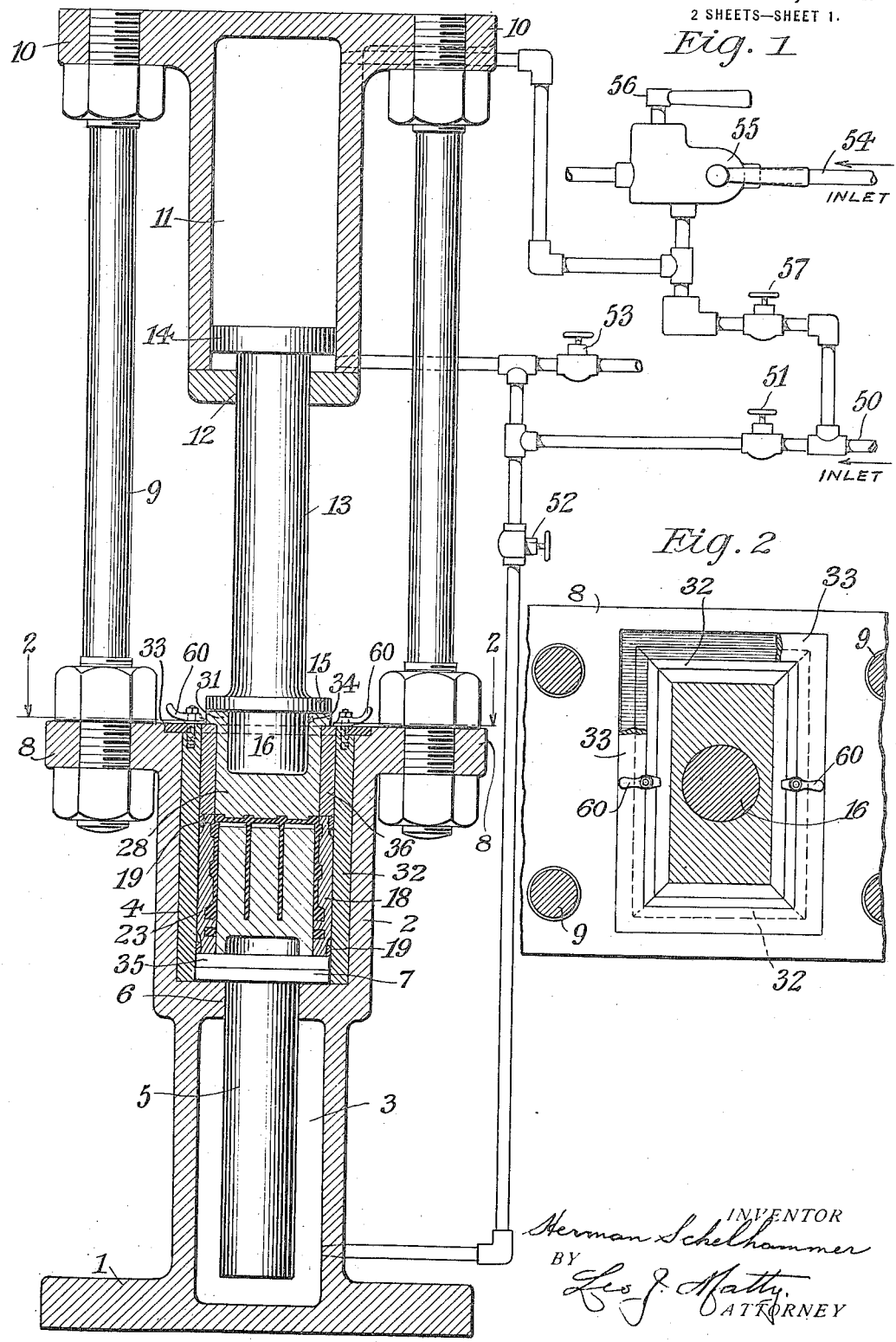

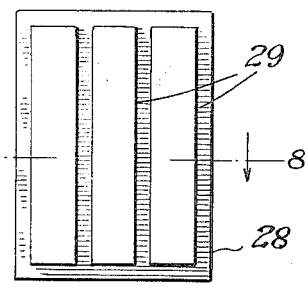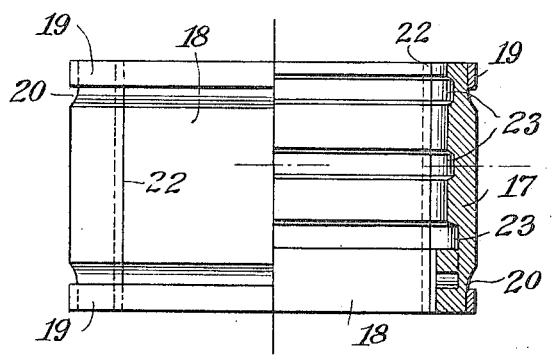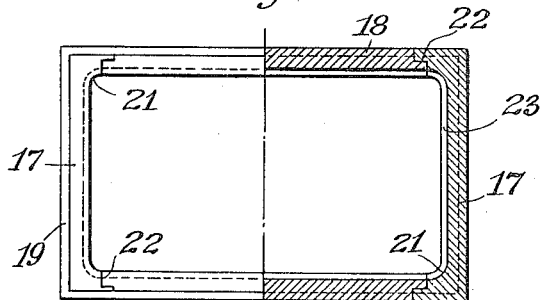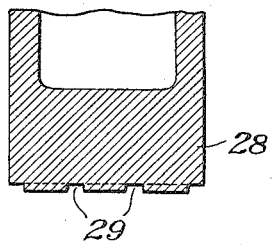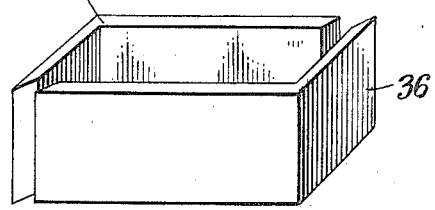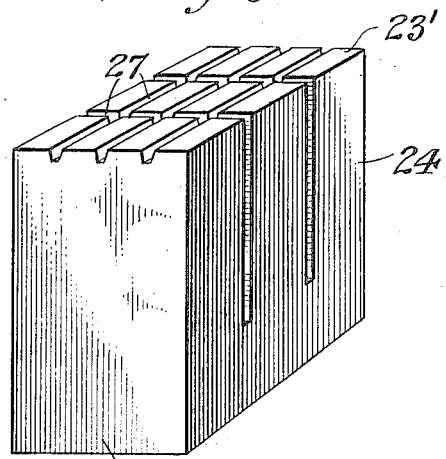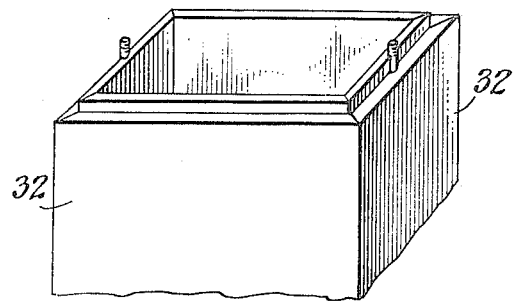

HERMAN SCHELHAMMER, OF WHITESTONE LANDING, NEW YORK, ASSIGNOR TO AMERICAN HARD RUBBER CO., OF NEW YORK, N. Y., A CORPORATION OF NEW YORK.

MANUFACTURE OF HARD-RUBBER BATTERY-JARS AND SIMILAR ARTICLES.

1,400,913. Specification of Letters Patent. Patented Dec. 20, 1921.

Application filed September 20, 1921. Serial No. 502,040.

*To all whom it may concern:*

Be it known that I, HERMAN SCHELHAMMER, a citizen of the United States of America, and a resident of Whitestone Landing, in the county of Queens and State of New York, have invented new and useful Improvements in the Manufacture of Hard-Rubber Battery-Jars and Similar Articles, of which the following is a full, clear, and exact description, such as will enable others skilled in the art to which it appertains to make and use the same.

This invention relates to the manufacture of hard rubber battery jars and similar articles, more particularly to a new and improved mold and to a press for holding said mold, and the objects of the invention are to provide a mold made in separate parts that is easily assembled and taken apart, in which the battery jar or similar article made of hard rubber compound can be vulcanized while still in the mold and taken apart when the battery jar, or similar article, is vulcanized and cured.

Further objects of the invention are to provide a press for said mold which acts to hold the mold together and all the parts thereof in alinement, while the press acts to force plastic hard rubber compound into the mold cavity.

To the accomplishment of the above objects and to such others as may hereinafter appear, the invention comprises a mold made in separate parts arranged to be detachably connected together and inserted in the mold chamber of a press which acts to hold the mold together and all the parts thereof in alinement. The press further comprises means for forcing plastic hard rubber compound into the mold cavity and means for removing the filled mold from the mold chamber.

Referring to the drawings:—

Figure 1 is a longitudinal section of a mold and press therefor, with connecting parts made in accordance with the present invention.

Fig. 2 is a sectional view on the line 2—2 of Fig. 1.

Fig. 3 is an enlarged detail view partly in section of the mold side members.

Fig. 4 is a top view of Fig. 3 partly in section.

Fig. 5 is an enlarged view in perspective of the plunger lining plates.

Fig. 6 is an enlarged view in perspective of the press lining plates.

Fig. 7 is an enlarged view of the bottom of the plunger.

Fig. 8 is a sectional view on the line 8—8 of Fig. 7.

Fig. 9 is an enlarged view in perspective of the core.

Referring to the drawings, 1 designates the base of a press upon which is supported, in the present instance, an upright body member 2, provided at its lower end with a ram cylinder 3, and at its upper end, with a mold chamber 4.

The ram cylinder 3 is provided with a ram 5 slidably mounted in a suitable bearing 6, formed in the body member 2 adjacent the lower end of the mold chamber 4. The top of the ram 5 is provided with a suitable cap 7 which rests upon the bottom of the mold chamber 4 when the ram 5 is depressed, as shown in Fig. 1. A spacing plate 35 is suitably secured to the top of the cap 7, which can be replaced with similar spacing plates to vary the depth and cross-sectional area of the lower end of the mold chamber in order to accommodate molds of different sizes.

The upper portion of the body member 2 of the press is provided with suitable lugs 8 to which are secured the lower ends of rods 9, the upper ends of which are secured to lugs 10 secured to the upper end of a ram cylinder 11 provided with a suitable bearing 12 in which is slidably mounted a ram 13 having a piston 14.

The ram 13 is arranged to bear directly over the mold chamber 4 of the press and is, in the present instance, provided at its lower end with an outwardly extending flange 15 below which is situated a centering member 16.

In the present instance and in accordance with the present invention the mold comprises separate side members 17 and 18 detachably connected together by means of suitable encircling bands 19, the top and bottom outside edges of the side members 17 and 18 being cut away as shown at 20 to provide a driving fit for the encircling bands 19, the outer edges of which are preferably arranged to be in line with and not to extend beyond the plane of the side members 17 and 18, when the encircling bands 19 are driven in position to hold the mold together, in which position the encircling bands 19 are preferably flush with the top and bottom edges of the side members 17 and 18, as clearly shown in Fig. 3.

In the present instance the mold side members 17 are preferably made U shape with rounded corners 21, whereas the mold side members 18 are made flat. The adjoining edges of the mold side members 17 and 18 are suitably rabbeted to make a rabbet joint as shown at 22, the same being cut as shown in Fig. 4 to facilitate the encircling bands 19 holding the mold side members firmly together.

The inner surfaces of the mold side members 17 and 18 are recessed as shown at 23 to provide stiffening or strengthening bands on the outer sides of the battery jars. It is also to be noted that if desired, names, trademarks, numbers, dates, etc., can be inscribed on the inner surfaces of the mold side members to provide suitable marking on the finished battery jar.

The mold side members 17 and 18, held firmly together by means of the encircling bands 19, as shown in Figs. 3 and 4, are adapted to fit over a suitable core 23′, in the present instance made in multiple to provide a plurality of individual battery cores 24 with an integral core base 25 cast in one piece as shown in Fig. 9. Each individual battery core 24 is preferably provided with a plurality of recesses 27 to form foot bars in the bottom of each individual battery jar.

The top of the mold which forms the bottom of the battery jar comprises, in the present instance, a plunger 28, the outside dimensions of the bottom or working face of which is approximately of the same dimensions as the inner edges of the assembled mold side members 17 and 18. The working face of the plunger 28 is preferably provided with a plurality of recesses 29 to form stiffening or strengthening bands on the bottom of the battery jars. The top of the plunger 28 is preferably provided with a centering cavity 30 which is arranged to fit the centering member 16 of the ram 13. The top of the plunger 28 is also preferably provided with a flange 31, which is preferably secured to the flange 15 to removably secure the plunger 28 to the end of the ram 13.

In order to facilitate the mold chamber 4 being used to contain molds of different sizes, the same is preferably provided with lining plates 32, in the present instance, four in number, arranged to closely fit the inner sides of the mold chamber, the abutting ends of the lining plates 32 being preferably beveled to make a tight fit. When the lining plates 32 are assembled around the sides of the mold chamber 4 the same are preferably held in place by means of a frame 33 which fits into suitable recesses 34 formed in the upper ends of the lining plates 32 and the top of the mold chamber 4.

In the present instance, after the lining plates 32 have been placed in position in the mold chamber 4, as shown in Fig. 1, the ram 5 is preferably raised until the spacing plate 35 thereon reaches the upper surface of the mold chamber 4, the ram 13 being in the meantime raised to its upper position. The mold side members 17 and 18, suitably bound together by means of the encircling bands 19, as before described, is then placed on top of the spacing plate 35, together with the core 23′ comprising the individual battery cores 24, the mold side members 17 and 18 engaging the core base 25 to hold the mold side members and core together.

The assembled mold side members and core are then lowered into the bottom of the mold chamber 4 by lowering the ram 5, the upper ram 13 being used to force the assembled mold side members and core into the bottom of the mold chamber as the same is preferably made to fit snugly against the sides of the lining plates 32.

Suitable lining plates 36 having in the present instance beveled ends, the upper edges of which are arranged to engage the flange 31 of the plunger 28 are provided for filling in the space surrounding the top of the mold chamber to the thickness of the mold side members 17 and 18.

After the assembled mold side members and core have been lowered or forced to the bottom of the mold chamber and the lining plates 36 placed in position and locked by means of suitable locking bolts 60, as shown in Fig. 1, a block of plastic unvulcanized hard rubber compound, heated to the required temperature, sufficient in amount to exactly fill the mold cavity, is then placed in the mold chamber above the top of the core, after which the plunger 28 through the action of the ram 13 is forced downward into the position shown in Fig. 1, thereby forcing the plastic hard rubber compound into the mold cavity to form the battery jar.

After the mold cavity has been filled with plastic hard rubber compound the ram 13 is raised, the locking bolts 60 loosened, after which the ram 5 is operated to raise the mold to the top of the mold chamber where the lining plates 36 are placed out of the way while the assembled mold side members and core are removed with its contents to a suitable vulcanizer where the contents are vulcanized in the mold, After the battery jar is vulcanized in the mold and the cure is finished the assembled mold side members are taken apart by removing the encircling bands 19, the core being free to release the completed battery jar, after which the mold side members and core are again assembled, as before described, and inserted in the press to form a new battery jar.

A suitable system of pipes connected to a suitable source of water under pressure is provided in the present instance for operating the rams 5 and 13. The present system of pipes comprises a low pressure inlet pipe 50 with valves 51, 52 and 53 which can be operated to raise and lower the ram 5 and to raise the ram 13. A high pressure inlet pipe 54 with valves 55, 56 and 57 is provided for forcing the ram 13 downward under high pressure to force the plastic unvulcanized hard rubber compound into the mold cavity as before described.

From the above description it will be seen that the mold comprises four separate side members and a core held firmly but detachably connected together by means of encircling bands which make up the sides and bottom of the mold, whereas the top of the mold comprises a separate plunger arranged to be moved into position to force the plastic unvulcanized hard rubber compound into the mold cavity.

It will also be seen that the mold chamber acts to hold the assembled mold together while the same is subjected to a very high pressure, the mold chamber also acts to keep the several parts of the mold including the plunger in alinement so that battery jars, or similar articles made of hard rubber, can be made uniform in shape and density.

It is also to be noted that the battery jar when formed in the press can be removed therefrom and vulcanized in the assembled mold with the exception of the plunger which is removed. This facilitates the battery jar or similar articles being cured and set without deformation of any kind before the mold is taken apart.

The excess plastic hard rubber compound, if any, will be squeezed out through the rabbet joints 22 a slight fin appearing at the side of the finished battery jar which can ordinarily be more easily removed than if the mold side members 17 and 18 were joined as are the lining plates 32 where the fin would occur at the corners of the finished battery jar. The rabbet joints 22 also permit of the rounded corners 21 which improve the appearance of the finished battery jar.

The provision of the upper and lower rams makes it possible to make a very snug fit between the mold and the mold chamber of the press, as by the use of the rams the mold is easily inserted and withdrawn therefrom.

While the invention has been described with particular reference to the details of construction the same is not to be considered as limited thereto, as many changes can be made and still fall within the scope of the invention set forth in the following claims:—

What I claim is:—

1. A mechanism for forming battery jars and similar articles of hard rubber comprising independent mold side members, the outer, upper and lower edges of which are cut away, and continuous detachable encircling bands arranged to engage the upper and lower cut away portions of said side members for holding the same together.

2. A mechanism for forming battery jars and similar articles of hard rubber comprising independent mold side members, a core having a core base, and detachable means surrounding the outer sides of said side members for holding the side members and core together.

3. A mechanism for forming battery jars and similar articles of hard rubber comprising a sectional mold, a core having a core base, means whereby the sections of the mold and the core may be clamped together or released and spread apart, a plunger forming a closure for the mold, a mold chamber for holding said mold and means for reciprocating said plunger into and out of the upper end of said mold chamber.

4. A mechanism for forming battery jars and similar articles of hard rubber comprising a sectional mold, a core having a core base, means whereby the sections of the mold and the core may be clamped together or released and spread apart, a plunger forming a closure for the mold, a mold chamber for holding said mold, means for reciprocating said plunger into and out of the upper end of said mold chamber, and means for forcing the mold into and out of said mold chamber.

5. A mechanism for forming battery jars and similar articles of hard rubber comprising a sectional mold, a core having a core base, a plunger forming a closure for the mold, a mold chamber, means for forcing said sectional mold and said core into and out of said mold chamber, and means for forcing said plunger into and out of the upper end of said mold chamber.

6. A mechanism for forming battery jars and similar articles of hard rubber comprising a sectional mold, a mold chamber arranged to snugly fit said mold, means for forcing said mold to the bottom of said mold chamber, a plunger forming a closure for the mold and means for forcing said plunger into and out of the upper end of said mold chamber.

7. A mechanism for forming battery jars and similar articles of hard rubber comprising a mold chamber, lining plates surrounding said mold chamber, a sectional mold arranged to snugly fit said mold chamber, a plunger forming a closure for the mold, lining plates surrounding said plunger, means for forcing said mold into the bottom of said mold chamber, and means for forcing said plunger into and out of the upper end of said mold chamber.

In testimony whereof I have signed this specification in the presence of two subscribing witnesses.

HERMAN SCHELHAMMER.

Witnesses:
HORACE H. NAHM,
F. C. HUSCHKE.